United States Patent
Warke et al.

(10) Patent No.: US 8,736,481 B2
(45) Date of Patent: May 27, 2014

(54) CARRIER FREQUENCY OFFSET COMPENSATION IN BEAMFORMING SYSTEMS

(75) Inventors: Nirmal C. Warke, Irving, TX (US); Srinath Hosur, Plano, TX (US); Venugopal Gopinathan, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 444 days.

(21) Appl. No.: 13/284,606

(22) Filed: Oct. 28, 2011

(65) Prior Publication Data

US 2013/0106641 A1    May 2, 2013

(51) Int. Cl.
  *G01S 7/40*    (2006.01)
(52) U.S. Cl.
  USPC .............. 342/21; 342/174; 342/194
(58) Field of Classification Search
  CPC ............ H04L 27/2273; H04L 2027/0016; H04L 2027/0018; H04L 2027/003; G01S 13/284; G01S 13/288; G01S 2007/2886; G01S 7/282; G01S 7/4002; H04B 7/0617; H04B 7/086
  USPC .......... 342/21, 81, 83–87, 100–103, 174, 194
  See application file for complete search history.

(56) References Cited

U.S. PATENT DOCUMENTS

| | | | |
|---|---|---|---|
| 4,166,274 A | | 8/1979 | Reudink et al. |
| 4,281,412 A * | | 7/1981 | Wissel et al. ............ 375/332 |
| 4,468,788 A * | | 8/1984 | Stoneburner ............ 375/239 |
| 4,501,002 A * | | 2/1985 | Auchterlonie ............ 375/332 |
| 5,287,388 A * | | 2/1994 | Ogura et al. ............ 375/344 |
| 5,400,363 A * | | 3/1995 | Waugh et al. ............ 375/324 |
| 5,422,917 A * | | 6/1995 | Scott ............ 375/371 |
| 8,416,759 B1 * | | 4/2013 | Narasimhan et al. ......... 370/344 |
| 2002/0154687 A1 | | 10/2002 | Bierly et al. |
| 2004/0048580 A1 | | 3/2004 | Lunn et al. |
| 2007/0205943 A1 | | 9/2007 | Nassiri-Toussi et al. |
| 2007/0268976 A1 * | | 11/2007 | Brink et al. ............ 375/260 |
| 2011/0063169 A1 | | 3/2011 | Chen et al. |
| 2012/0155512 A1 * | | 6/2012 | Giannakis et al. ............ 375/141 |
| 2013/0106641 A1 * | | 5/2013 | Warke et al. ............ 342/21 |
| 2013/0135140 A1 * | | 5/2013 | Kishigami et al. ............ 342/189 |

OTHER PUBLICATIONS

"The CM Array: An Adaptive Beamformer for Constant Modulus Signals," 1986 IEEE International Conference on Acoustics, Speech, and Signal Processing (ICASSP '86), Apr. 1986, pp. 2523-2526 (Gooch, et al.).

* cited by examiner

*Primary Examiner* — John B Sotomayor
(74) *Attorney, Agent, or Firm* — John R. Pessetto; Wade J. Brady, III; Frederick J. Telecky, Jr.

(57) ABSTRACT

A method for communicating signals in an ultra high bandwidth system that compensates for carrier frequency offset is provided. A baseband transmit signal having a plurality of data bits is generated. The baseband transmit signal is upconverted to a radio frequency (RF) transmit signal using a first local oscillator signal having a first carrier frequency. An offset cancellation for the offset between the first carrier frequency and a second carrier frequency for a second local oscillator signal that is used to downconvert an RF receive signal is calculated. The offset cancellation is applied to a plurality of phase rotators, and the RF transmit signal is transmitted over a phased array.

18 Claims, 3 Drawing Sheets

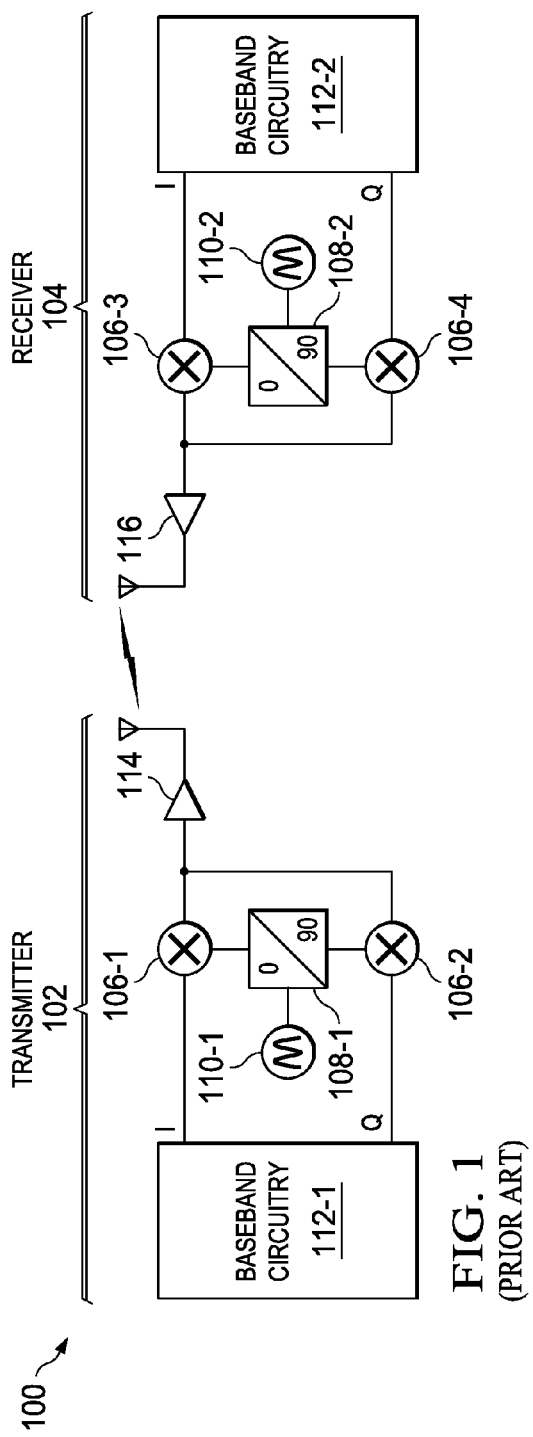
FIG. 1 (PRIOR ART)
FIG. 2 (PRIOR ART)
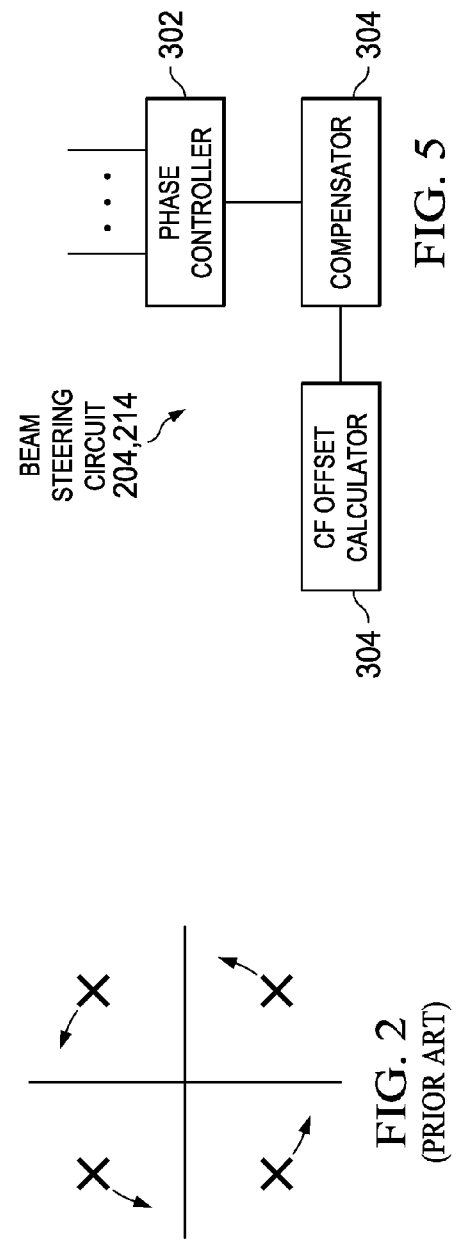
FIG. 5

CARRIER FREQUENCY OFFSET COMPENSATION IN BEAMFORMING SYSTEMS

TECHNICAL FIELD

The invention relates generally to phased arrays and, more particularly, to carrier frequency offset compensation in phased array systems.

BACKGROUND

Turning to FIG. 1, an example of a conventional communication system 100 can be seen. In this system 100, there is a transmitter 102 and a receiver 104 that each employ direct conversion circuitry, although superheterodyne circuitry can also employed. For the transmitter 102, there is a modulator (which generally includes phase adjustment circuit 108-1 (which can, for example, be a hybrid) and mixers 106-1 and 106-2) and local oscillator 110-1 that receives in-phase (I) and quadrature (Q) signals from baseband circuitry 112-1 and upconverts these signals to a radio frequency (RF) signal. The RF signals are then amplified by power amplifier (PA) 114 and transmitted to the receiver 104. The receiver amplifies its received RF signals with low noise amplifier (LNA) 116 and downconverts these signals with a demodulator (which generally comprises misers 106-3 and 106-4 and phase adjustment circuitry 108-2) and local oscillator 110-2 so as to generate I and Q signals for the baseband circuitry 112-2.

One issue with this arrangement is that it is difficult to have matching local oscillator signals (from local oscillators 110-1 and 110-2). If there is a difference in frequency the constellation can rotate; an example of which can be seen in FIG. 2, where there is a constellation rotation of a 4-QAM (quadrature amplitude modulation) system. This frequency difference is known as a carrier frequency offset, and, in conventional RF communications systems, carrier frequency offset compensation is usually accomplished by rotating the received baseband constellation (in the digital domain). Performing such digital compensation, however, can be impractical in ultrahigh bandwidth systems (such as millimeter wave or terahertz systems). Therefore, there is a need for analog low cost carrier frequency offset compensation in ultrahigh bandwidth systems.

Some examples of conventional systems are: U.S. Pat. No. 4,166,274; and Gooch et al., "The CM Array: An Adaptive Beamformer for Constant Modulus Signals," 1986 *IEEE International Conference on Acoustics, Speech, and Signal Processing* (*ICASSP* '86), April 1986, pp. 2523-2526.

SUMMARY

A preferred embodiment of the present invention, accordingly, provides an apparatus. The apparatus comprises a receiver having a first local oscillator signal with a first carrier frequency; and a transmitter having: a second local oscillator signal with a second carrier frequency; a signal generator that receives the second local oscillator signal; a phased array; a plurality of phase rotators that are coupled between the signal generator and the phased array; and a beam steering circuit that is coupled to each phase rotator, wherein the beam steering circuit calculates an offset cancellation for the offset between the first carrier frequency and the second carrier frequency, and wherein the beam steering circuit applies the offset cancellation to each phase rotator.

In accordance with an embodiment of the present invention, the beam steering circuit further comprises: a phase controller that is configured to control the phase of each phase rotator; a carrier frequency offset calculator that is configured to calculate the offset cancellation; and a compensator that is configured to apply the offset cancellation to the phase controller.

In accordance with an embodiment of the present invention, the beam steering circuit is implemented as software embodied on a processor.

In accordance with an embodiment of the present invention, the signal generator further comprises: a signal source that generates in-phase (I) and quadrature (Q) signals; a local oscillator that generates the second local oscillator signal; a phase adjustment circuit is coupled to the local oscillator so as to receive the second local oscillator signal; a first mixer that is coupled to the signal source so as to receive the I signal and that is coupled to the phase adjustment circuit; and a second mixer that is coupled to the signal source so as to receive the Q signal and that is coupled to the phase adjustment circuit.

In accordance with an embodiment of the present invention, the phase adjustment circuit further comprises a hybrid.

In accordance with an embodiment of the present invention, the signal source further comprises a baseband circuit.

In accordance with an embodiment of the present invention, the phase rotators are adjusted on a per symbol basis.

In accordance with an embodiment of the present invention, a method is provided. The method comprises generating a baseband transmit signal having a plurality of data bits; upconverting the baseband transmit signal to a radio frequency (RF) transmit signal using a first local oscillator signal having a first carrier frequency; calculating an offset cancellation for the offset between the first carrier frequency and a second carrier frequency for a second local oscillator signal that is used to downconvert an RF receive signal; applying the offset cancellation to a plurality of phase rotators; and transmitting the RF transmit signal over a phased array.

In accordance with an embodiment of the present invention, the method further comprises adjusting the phase rotators on a per symbol basis.

In accordance with an embodiment of the present invention, the baseband transmit signal further comprises transmit I and Q signals.

In accordance with an embodiment of the present invention, the step of upconverting further comprises: generating first and second phases of the first local oscillator signal; and mixing the I and Q signals with the first and second phases of the first oscillator signal, respectively.

In accordance with an embodiment of the present invention, an apparatus is provided. The apparatus comprises a receiver having: an antenna; a low noise amplifier (LNA) that is coupled to the antenna; and a demodulator that is coupled to the LNA and that demodulates an RF receive signal using a first local oscillator signal with a first carrier frequency; and a transmitter having: a second local oscillator signal with a second carrier frequency; a signal generator that receives the second local oscillator signal; a phased array; a plurality of phase rotators that are coupled between the signal generator and the phased array; and a beam steering circuit that is coupled to each phase rotator, wherein the beam steering circuit calculates an offset cancellation for the offset between the first carrier frequency and the second carrier frequency, and wherein the beam steering circuit applies the offset cancellation to each phase rotator.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 is a diagram of an example of a conventional RF system;

FIG. 2 is a diagram of an example of a constellation rotation in a 4-QAM system;

FIG. 5 is a diagram of an example of the beam steering circuit of FIGS. 3 and 4.

DETAILED DESCRIPTION

Figure 3:
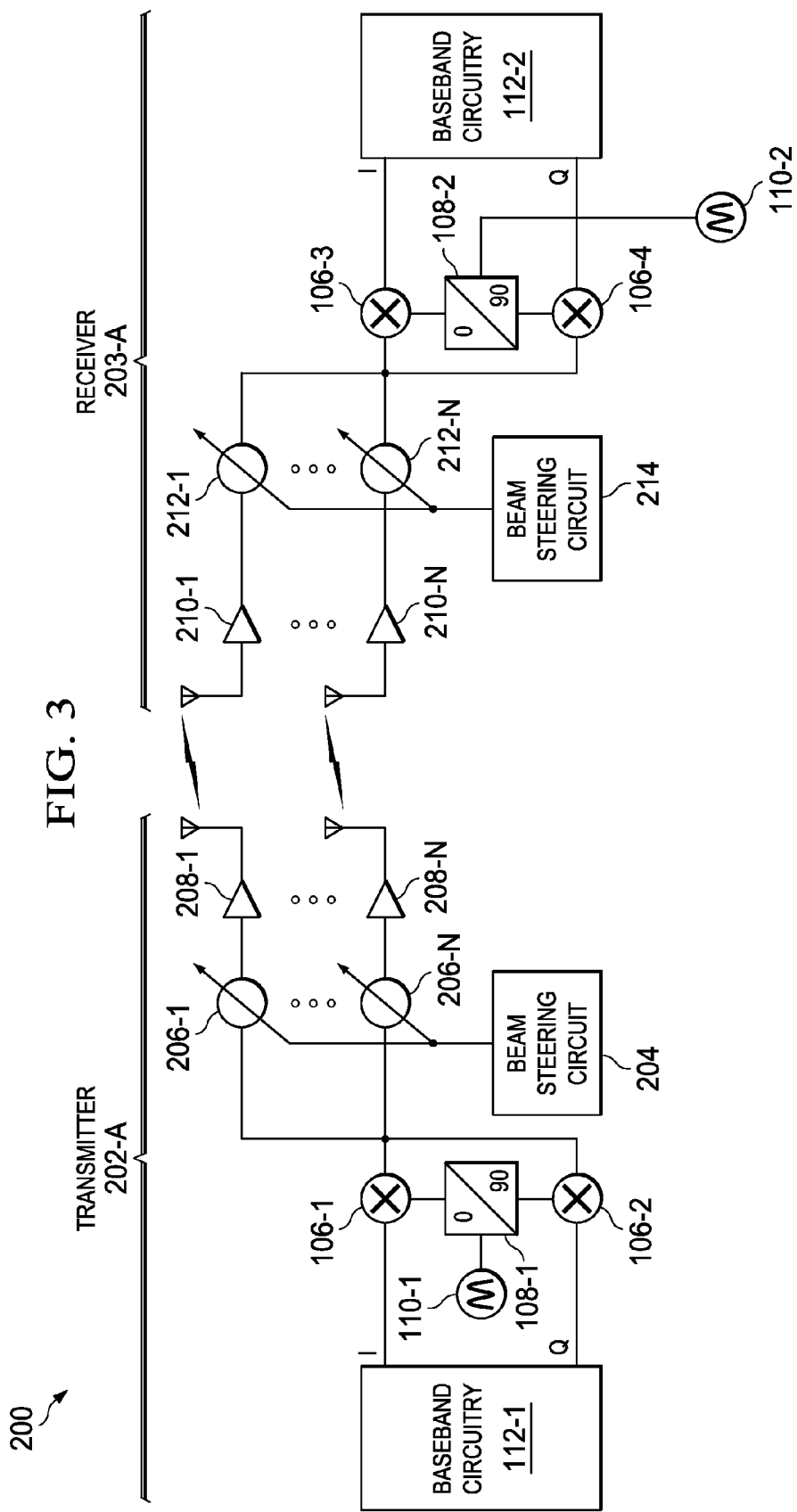
FIGS. 3 and 4 are diagrams of examples of a system in accordance with a preferred embodiment of the present invention.
Figure 4:
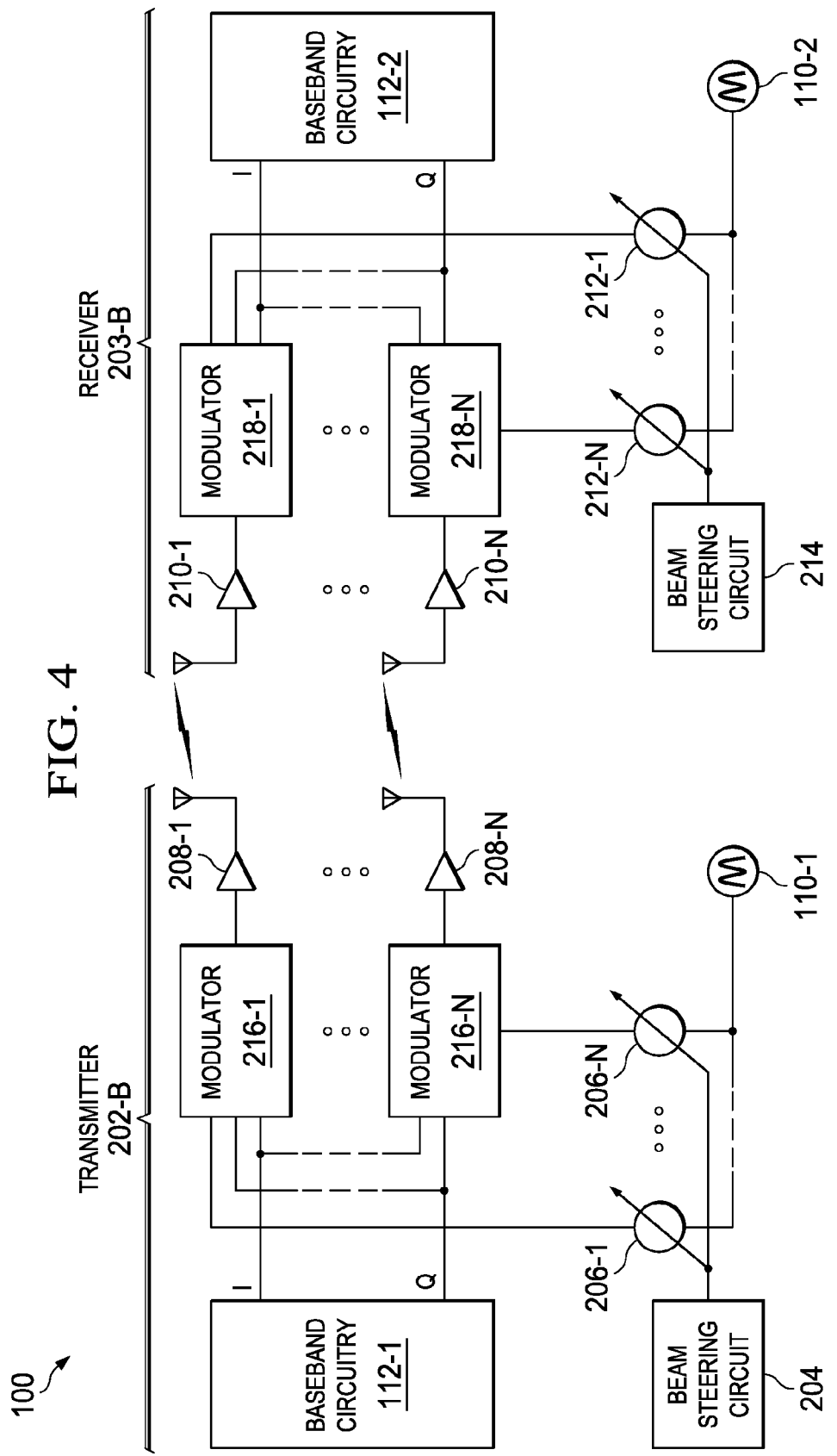

Refer now to the drawings wherein depicted elements are, for the sake of clarity, not necessarily shown to scale and wherein like or similar elements are designated by the same reference numeral through the several views.

Turning to FIG. 3, an example of a system 200 in accordance with an embodiment of the present invention can be seen. As shown, the system 200 is similar to system 100, except that transmitter 102 has been replace with transmitter 202. Transmitter 202 (similar to transmitter 102) employs direct conversion circuitry, but superhederodyne circuitry can be employed as well. Transmitter 202-A, though, uses a phased array (which is generally comprised of beam steering circuit 204, phase rotators 206-1 to 206-N, and PAs 208-1 to 208-N) that operates in the millimeter wave or terahertz frequency range. An example of such a phased array system can be seen in U.S. patent application Ser. No. 12/878,484, which is entitled "TERAHERTZ PHASED ARRAY SYSTEM," which was filed on Sep. 9, 2010, and which is hereby incorporated by reference for all purposes. This arrangement allows for a beam of directed terahertz or millimeter wave energy to be directed to the receiver 104 or to receiver 203-A. Receiver 203-A is similar to receiver 104 except that includes LNAs 210-1 to 210-N, phase rotators 212-1 to 212-N and beam steering circuit 214, which allow the transmitter 202-A and receiver 203-A to point to one another. An example of a system that can employ this arrangement are U.S. patent application Ser. No. 13/226, 133, which is entitled "WIRELESS ROUTER SYSTEM," which was filed on Sep. 6, 2011, and which is incorporated by reference for all purposes. Additionally and alternatively, the modulator (mixers 106-1 and 106-2 and phase adjustment circuit 108-1) and demodulator (mixers 106-3 and 106-4 and phase adjustment circuit 108-2) of transmitter 202-A and receiver 203-B can be replaced by modulators 216-1 to 216-N and demodulators 218-1 to 218-N of transmitter 202-B and receiver 203-B, where the signals from local oscillators 110-1 and 110-2 being phase shifted by phase rotators 206-1 to 206-N and 212-1 to 212-N. The receiver 203-A/203-B may also have a phased array of a different size from transmitter 202-A/202-B.

The beam steering circuit 204 and/or 214 (which can be seen in greater detail in FIG. 5) can then be advantageously used to compensate for carrier frequency offset between the local oscillators 110-1 and 110-2. Typically, the beam steering circuit 204 and/or 214 is implemented in hardware, but it can also be implemented (or have portions) implemented in software that is embodied on a processor (such as a digital signals processor or DSP). The beam steering circuit 204 and/or 214 is generally comprised of a phase controller 302 (which is able to independently control the phase rotators 206-1 to 206-N and/or 212-1 to 212-N so as to control the direction of the beam), a carrier frequency (CF) offset calculator 304, and an (optional) compensator 304. The CF offset calculator 304 is able to calculate the carrier frequency offset between the local oscillators 110-1 and 110-2 using conventional techniques that employ training sequences or otherwise. Specifically, the CF offset calculator 304 is able to calculate a difference $\Delta F$. The received downconverted signal after the mixers 106-3 and 106-4 is proportional to:

$$\cos(2\pi n T(\Delta F)), \quad (1)$$

where T is the symbol period. Since encoded digital signals (i.e., 4-QAM) are transmitted, this adjustment can be applied at the phase rotators 206-1 to 206-N to the transmitted or received signal on a per symbol basis to yield a phase shift for phase path (i) at symbol (n) of:

$$\Phi_n^i = \Phi_{n-1}^i + 2\pi T(\Delta F). \quad (2)$$

Because the same adjustment is applied to all phase rotators 206-1 to 206-N, the relative phase between the phase rotators 206-1 to 206-N remains constant so that the beam remains pointed in the desired direction. Thus, carrier frequency offset correction does not generally interfere with the functionality of the system 200. As indicated, the offset compensation can occur in receiver 203 or 104, the transmitter 202, or both; typically, offset compensation can occur in the receiver 203 or 104 can be performed if offset information is available at the receiver 203 or 104.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. An apparatus comprising:
   a receiver having a first local oscillator signal with a first carrier frequency; and
   a transmitter having:
      a second local oscillator signal with a second carrier frequency;
      a signal generator that receives the second local oscillator signal;
      a phased array;
      a plurality of phase rotators that are coupled between the signal generator and the phased array; and
      a beam steering circuit that is coupled to each phase rotator, wherein the beam steering circuit calculates an offset cancellation for the offset between the first carrier frequency and the second carrier frequency, and wherein the beam steering circuit applies the offset cancellation to each phase rotator.

2. The apparatus of claim 1, wherein the beam steering circuit further comprises:
- a phase controller that is configured to control the phase of each phase rotator;
- a carrier frequency offset calculator that is configured to calculate the offset cancellation; and
- a compensator that is configured to apply the offset cancellation to the phase controller.

3. The apparatus of claim 2, wherein the beam steering circuit is implemented as software embodied on a processor.

4. The apparatus of claim 2, wherein the signal generator further comprises:
- a signal source that generates in-phase (I) and quadrature (Q) signals;
- a local oscillator that generates the second local oscillator signal;
- a phase adjustment circuit is coupled to the local oscillator so as to receive the second local oscillator signal;
- a first mixer that is coupled to the signal source so as to receive the I signal and that is coupled to the phase adjustment circuit; and
- a second mixer that is coupled to the signal source so as to receive the Q signal and that is coupled to the phase adjustment circuit.

5. The apparatus of claim 4, wherein the phase adjustment circuit further comprises a hybrid.

6. The apparatus of claim 5, wherein the signal source further comprises a baseband circuit.

7. The apparatus of claim 6, wherein the phase rotators are adjusted on a per symbol basis.

8. A method comprising:
- generating a baseband transmit signal having a plurality of data bits;
- upconverting the baseband transmit signal to a radio frequency (RF) transmit signal using a first local oscillator signal having a first carrier frequency;
- calculating an offset cancellation for the offset between the first carrier frequency and a second carrier frequency for a second local oscillator signal that is used to downconvert an RF receive signal;
- applying the offset cancellation to a plurality of phase rotators; and
- transmitting the RF transmit signal over a phased array.

9. The method of claim 8, wherein the method further comprises adjusting the phase rotators on a per symbol basis.

10. The method of claim 9, wherein the baseband transmit signal further comprises transmit I and Q signals.

11. The method of claim 9, wherein the step of upconverting further comprises:
- generating first and second phases of the first local oscillator signal; and
- mixing the I and Q signals with the first and second phases of the first oscillator signal, respectively.

12. An apparatus comprising:
- a receiver having:
  - an antenna;
  - a low noise amplifier (LNA) that is coupled to the antenna; and
  - a demodulator that is coupled to the LNA and that demodulates an RF receive signal using a first local oscillator signal with a first carrier frequency; and
- a transmitter having:
  - a second local oscillator signal with a second carrier frequency;
  - a signal generator that receives the second local oscillator signal;
  - a phased array;
  - a plurality of phase rotators that are coupled between the signal generator and the phased array; and
  - a beam steering circuit that is coupled to each phase rotator, wherein the beam steering circuit calculates an offset cancellation for the offset between the first carrier frequency and the second carrier frequency, and wherein the beam steering circuit applies the offset cancellation to each phase rotator.

13. The apparatus of claim 12, wherein the beam steering circuit further comprises:
- a phase controller that is configured to control the phase of each phase rotator;
- a carrier frequency offset calculator that is configured to calculate the offset cancellation; and
- a compensator that is configured to apply the offset cancellation to the phase controller.

14. The apparatus of claim 13, wherein the beam steering circuit is implemented as software embodied on a processor.

15. The apparatus of claim 13, wherein the signal generator further comprises:
- a signal source that generates I and Q signals;
- a local oscillator that generates the second local oscillator signal;
- a phase adjustment circuit is coupled to the local oscillator so as to receive the second local oscillator signal;
- a first mixer that is coupled to the signal source so as to receive the I signal and that is coupled to the phase adjustment circuit; and
- a second mixer that is coupled to the signal source so as to receive the Q signal and that is coupled to the phase adjustment circuit.

16. The apparatus of claim 15, wherein the phase adjustment circuit further comprises a hybrid.

17. The apparatus of claim 16, wherein the signal source further comprises a baseband circuit.

18. The apparatus of claim 17, wherein the phase rotators are adjusted on a per symbol basis.

\* \* \* \* \*